A. P. WOLFE.
CORN HUSKING MACHINE.
APPLICATION FILED NOV. 5, 1907.
1,166,647.
Patented Jan. 4, 1916.
5 SHEETS—SHEET 1.
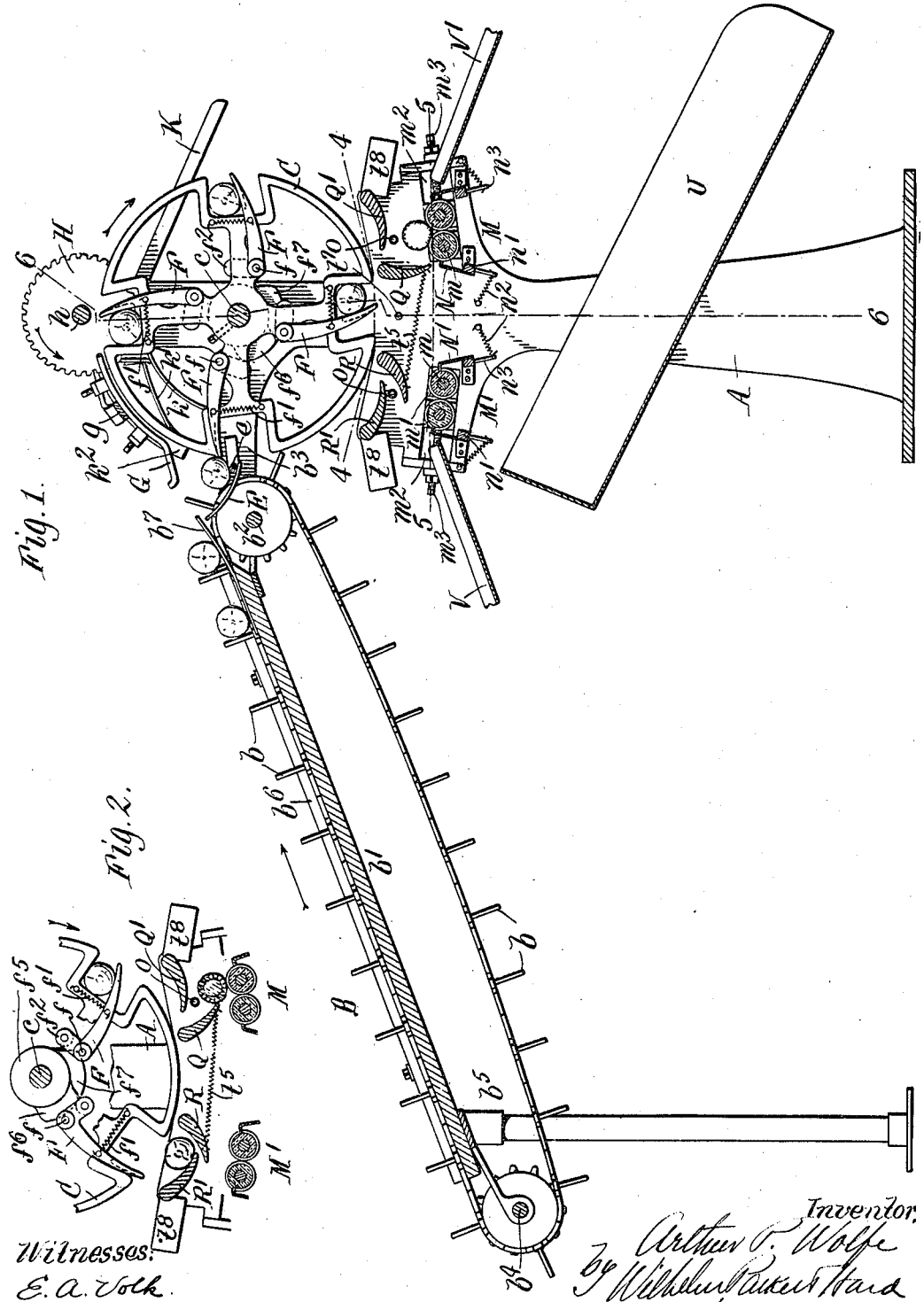

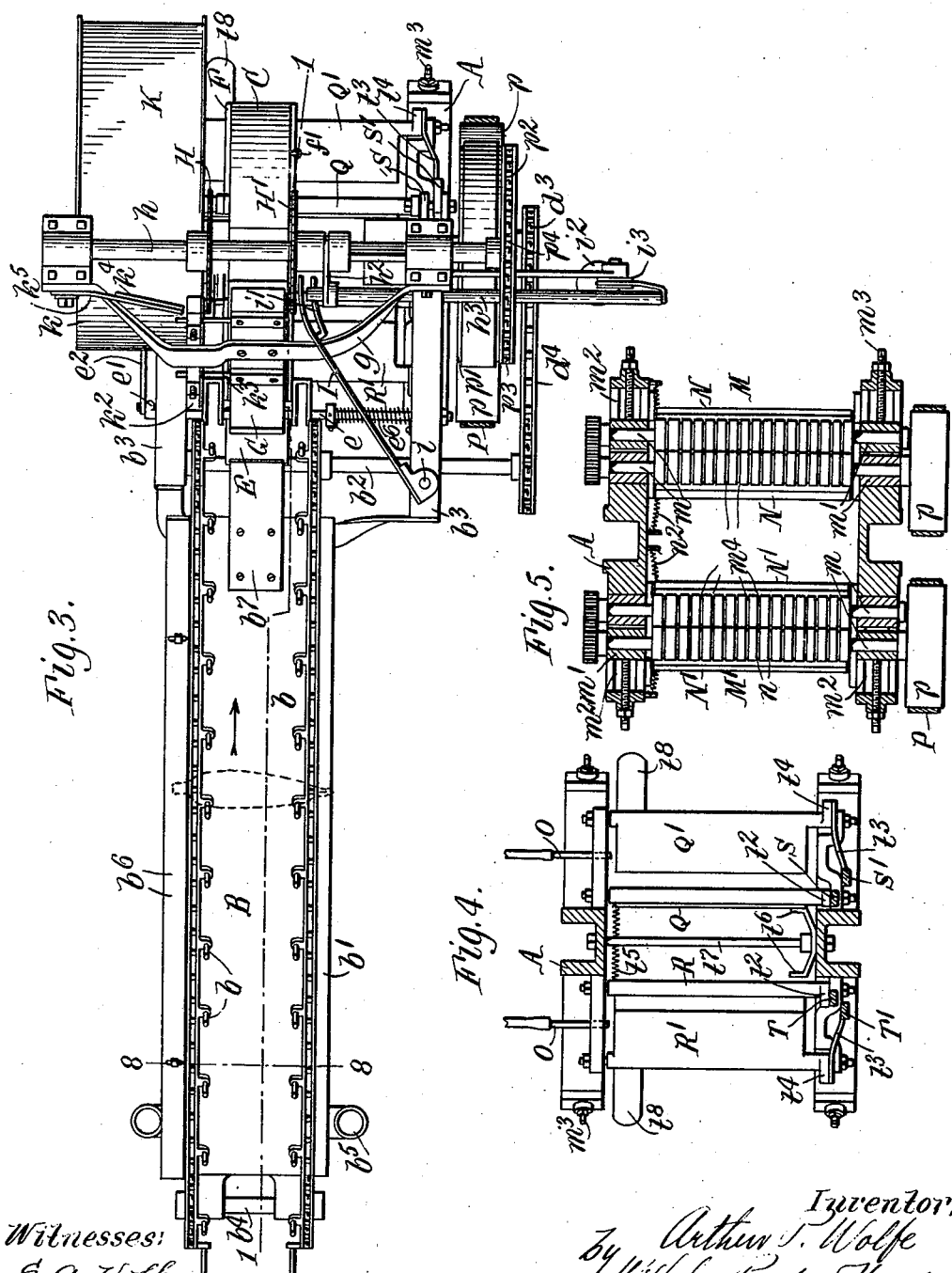

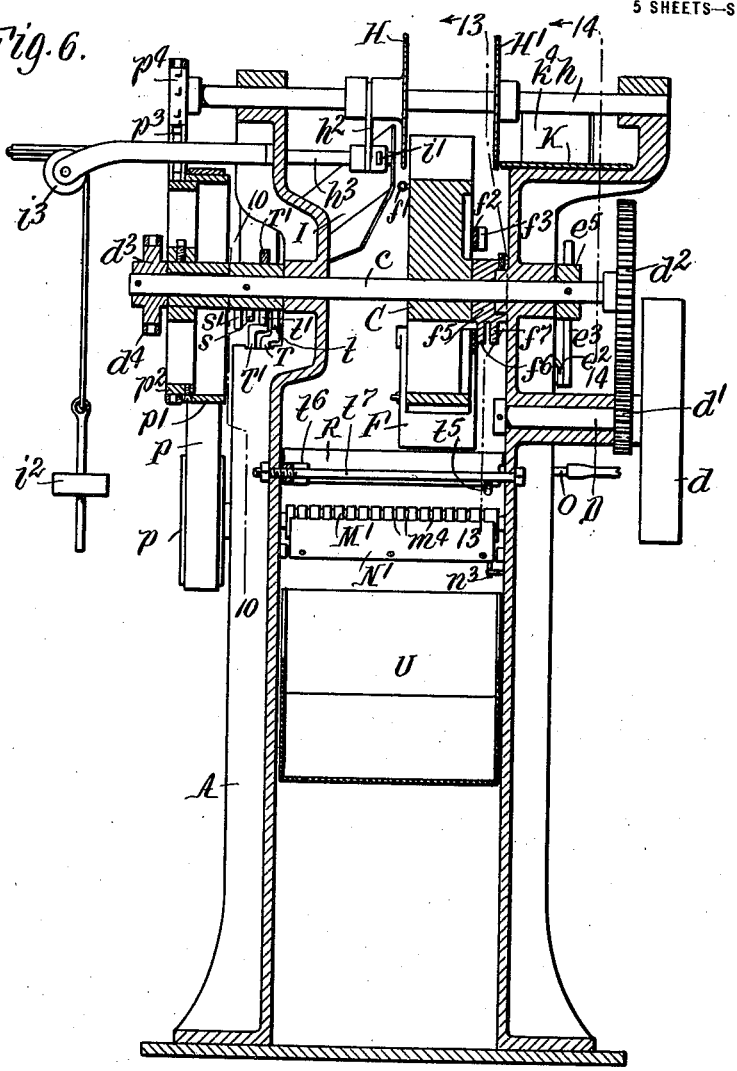

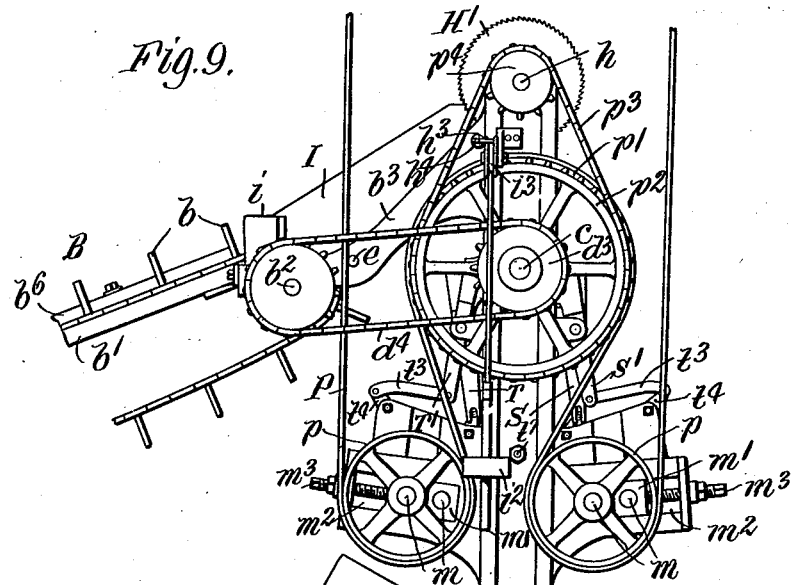
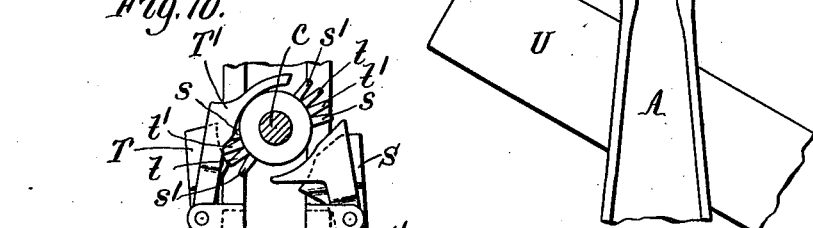
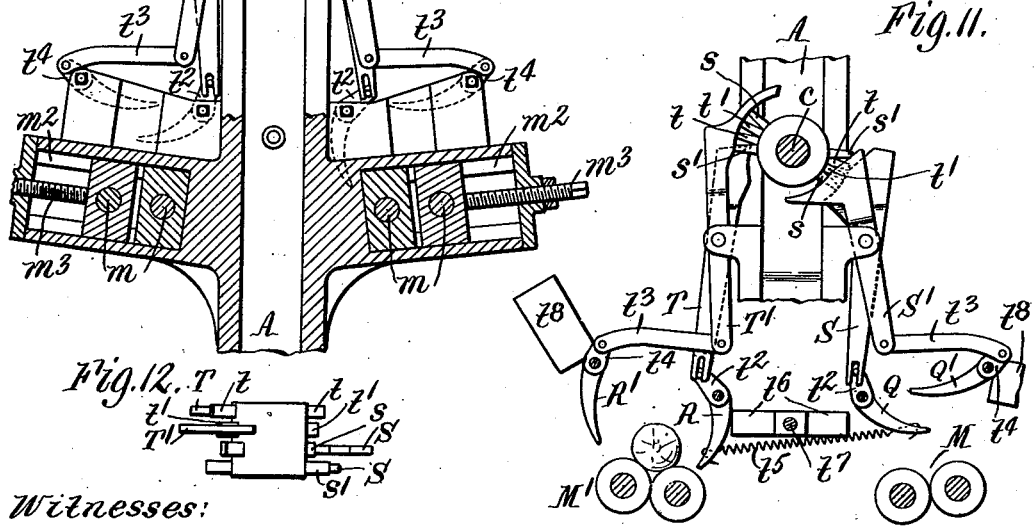

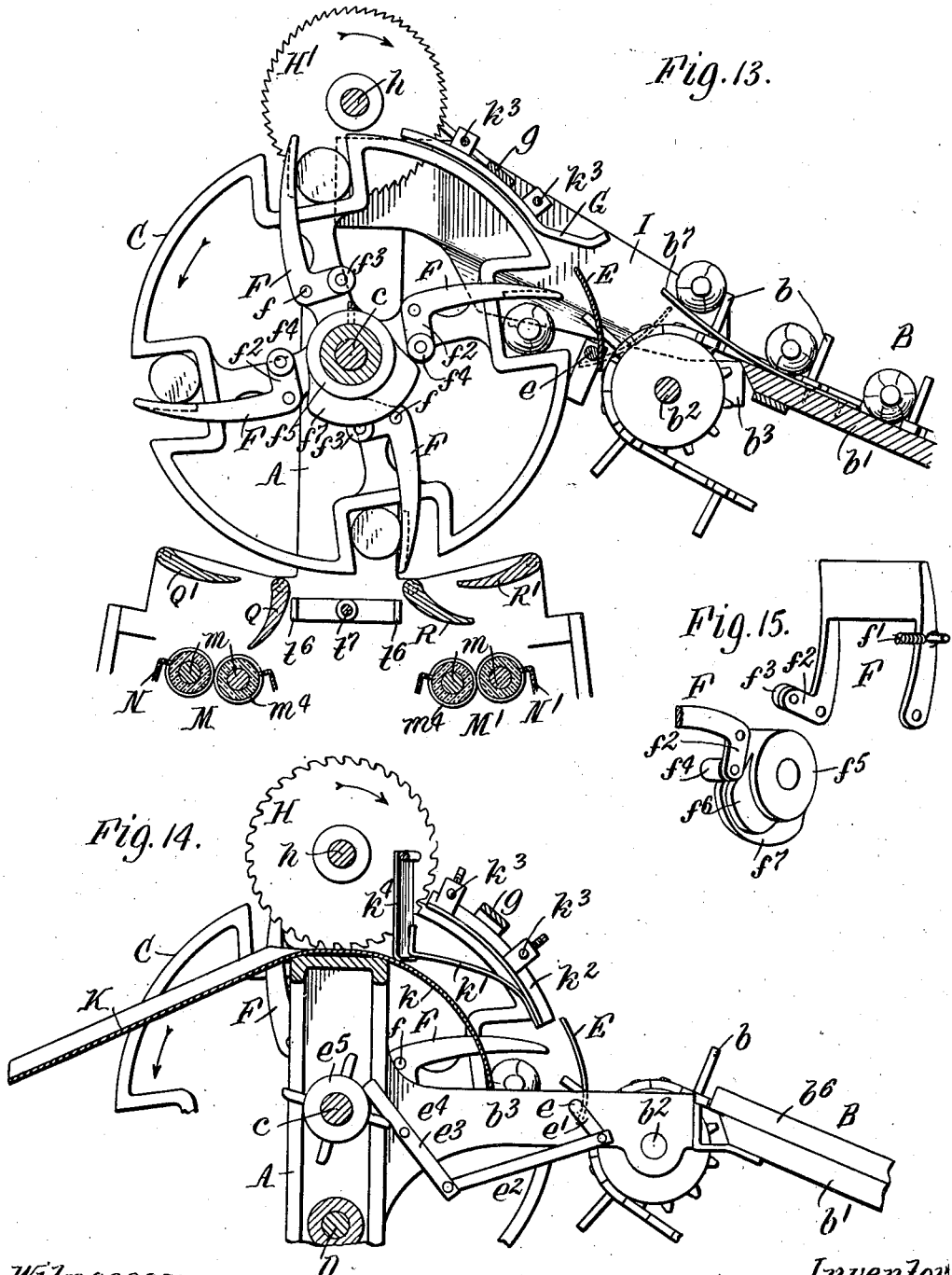

UNITED STATES PATENT OFFICE.

ARTHUR P. WOLFE, OF BUFFALO, NEW YORK, ASSIGNOR TO HUNTLEY MANUFACTURING COMPANY, OF SILVER CREEK, NEW YORK.

CORN-HUSKING MACHINE.

1,166,647.   Specification of Letters Patent.   Patented Jan. 4, 1916.

Application filed November 5, 1907. Serial No. 400,871.

*To all whom it may concern:*

Be it known that I, ARTHUR P. WOLFE, a citizen of the United States, residing at Buffalo, in the county of Erie and State of New York, have invented a new and useful Improvement in Corn-Husking Machines, of which the following is a specification.

This invention relates to corn husking machines and has for its primary object to produce a rapid and efficient machine of comparatively simple and inexpensive construction, which will completely remove the husks and silk from the ears without waste of or injury to the corn, and which will operate with practical uniformity notwithstanding irregularities in the size, shape and condition of the ear, so that the ears can be fed to the machine without any attempt at selection, that is, just as the corn happens to run.

Other objects of the invention are to provide two sets of husking rolls and a rotary carrier or wheel for automatically delivering the ears first to one set of rolls and then to the other, so that while one ear is being husked by one pair of rolls another ear is being delivered to the other pair of husking rolls, whereby the capacity of the machine is greatly increased; also to provide gates or devices between the husking rolls and the carrier to which the ears are delivered by the carrier and which act to gently lay the ears lengthwise in proper position on the husking rolls notwithstanding irregularities in the shape and size of the ears, which might otherwise cause an improper presentation of the ears to the rolls and so defeat the proper husking action thereof; also to provide a traveling feed conveyer upon which the ears of corn can be readily laid in order, and means for successively transferring the ears from the feed conveyer to the holders of the rotary carrier; also to provide husking rolls and scrapers therefor of novel construction, such that the husks and silk will be scraped from the rolls and discharged from the machine as it is removed from the corn and will not accumulate and clog the rolls.

In the accompanying drawings, consisting of five sheets: Figure 1 is a longitudinal sectional elevation of a corn husking machine embodying the invention, in line 1—1, Fig. 3. Fig. 2 is a sectional elevation of the lower portion of the rotary carrier and associated parts, showing a different position thereof from that shown in Fig. 1. Fig. 3 is a plan view of the machine. Fig. 4 is a sectional plan view of the machine, in line 4—4, Fig. 1. Fig. 5 is a sectional plan thereof, in line 5—5, Fig. 1. Fig. 6 is a transverse sectional elevation thereof, in line 6—6, Fig. 1. Fig. 7 is a fragmentary perspective view, on an enlarged scale, of one of the husking rolls and the scraper therefor. Fig. 8 is a cross-section, on an enlarged scale, of the feed conveyer, in line 8—8, Fig. 3. Fig. 9 is a side elevation of the upper portion of the machine. Fig. 10 is a fragmentary sectional elevation, on an enlarged scale, in line 10—10, Fig. 6, of the hopper or gate operating mechanism. Fig. 11 is a view similar to Fig. 10, showing a different position of the parts. Fig. 12 is a plan view, on an enlarged scale, of the tappet wheel and operating levers for the hoppers or gates. Fig. 13 is a fragmentary sectional elevation of the machine, on an enlarged scale, in line 13—13, Fig. 6. Fig. 14 is a fragmentary sectional elevation thereof, on an enlarged scale, in line 14—14, Fig. 6. Fig. 15 is a perspective view, on an enlarged scale, of one of the holders of the rotary carrier and the operating cam therefor.

Like letters of reference refer to like parts in the several figures.

Briefly stated, the machine shown in the drawings is organized and operates as follows:

Two sets or pairs of rapidly rotating husking rolls are provided which rotate the ears of corn resting in the valley between them, and grasp and feed the husks and silk between them, thus tearing the same from the corn. The ears of corn are laid upon a traveling feed conveyer with their stalk ends against a gage at one side of the conveyer, and this conveyer and a coöperating transfer device feed the ears successively to the holders of a rotary carrier or wheel arranged above the two sets of husking rolls. The holders of the rotary carrier grasp and hold the ears firmly and first present the ears to a pair of rotary stalk and tip cutters or saws arranged at opposite sides of the carrier. The tip cutter is movable lengthwise of the ears toward and from the stalk cutter and is connected to an operating gage or device arranged to be engaged by the tips of the ears as they are carried to the cutters and shoved aside more or less, depending upon the length of the ears, to thereby so position the cutter that it will cut the tips of the husks and the soft unfilled tips of the cobs, but will not cut into the corn on the cob. A hopper or pair of gates is provided between each pair of husking rolls and the rotary carrier, and as the latter rotates, the ear is automatically delivered from one holder to the hopper or gates for one set of husking rolls and from the next succeeding holder to the other hopper or gates. These gates are operated to first form a receptacle to receive the ear from the carrier and are then gradually opened downwardly to gently deposit the ear upon the husking rolls, after which the gates are swung back to the receiving position, one of the gates in returning after the ear has been husked by the rolls acting to kick or discharge the husked ear from the husking rolls. The rotary carrier and gates are so timed in their action that one ear is received from the carrier and deposited upon one pair of husking rolls, and while this ear is being husked the other gates are receiving and depositing another ear upon the other pair of husking rolls, the gates for the first pair of husking rolls being operated to receive and deposit a third ear while the second ear is being husked by the second pair of husking rolls. The duplication of the husking rolls is desirable to increase the capacity of the machine, but most features of the invention would be equally desirable regardless of the number of ears being operated upon at a time.

A represents the main frame of the machine, which may be of any suitable construction. The frame shown consists of two side standards rising from a suitable base and suitably tied together at their upper portions.

B represents a feed conveyer, which, in the construction shown, consists of two parallel endless chains provided with opposite upwardly-projecting pins $b$ between which the ears of corn are laid, and an inclined board $b'$ over which the upper runs of the chains travel. The chains pass around sprocket wheels at the upper end of the conveyer secured to a drive shaft $b^2$ journaled in brackets $b^3$ on the frame standards, and sprocket wheels at the lower end of the conveyer on a shaft $b^4$ mounted in a support or frame $b^5$. A strip $b^6$ is secured on said board $b'$ at one side of the conveyer so as to be adjustable toward and from the adjacent chain, and serves as a gage against which the butt end of the ears are placed to determine the point at which the stalks shall be cut off.

$b^7$ represents a plate curving upwardly between the conveyer pins at the upper end of the feed board $b'$ which holds the ears back against the conveyer pins. The feed conveyer can be of any other suitable construction and can be driven by any suitable drive device, but is preferably driven as hereinafter described.

C represents a rotary carrier or wheel provided with peripheral pockets which receive the ears from the feed conveyer and carry them to the gates for the husking rolls. This carrier is secured to a horizontal shaft $c$ which is journaled at opposite ends in suitable bearings on the frame standards, and can be driven at the proper speed by any suitable means. In the construction shown, a drive shaft D, Fig. 6, is journaled in a suitable bearing on one of the side standards and is provided with a pulley $d$ for the driving belt. A gear pinion $d'$ is secured to the drive shaft and meshes with a gear wheel $d^2$ secured to the carrier shaft. The carrier shaft is also preferably provided with a sprocket wheel $d^3$ connected by a chain $d^4$, Fig. 9, with a sprocket wheel secured to the upper shaft $b^2$ of the feed conveyer for driving the latter.

E, Figs. 1, 13 and 14, represents a transfer device arranged between the feed conveyer and the rotary carrier for moving the ears from the former into the pockets of the carrier as the same are brought successively into receiving position. This transfer device, in the construction shown, consists of a plate normally occupying the position shown in Fig. 1, between the upper ends of the feed conveyer chains and secured to a rock shaft $e$ which is journaled in suitable bearings in the frame brackets $b^3$. The rock shaft is provided at one end with a rock arm $e'$, Fig. 14, connected by a link $e^2$ to a lever $e^3$ which is fulcrumed at $e^4$ on the adjacent frame bracket $b^3$ with one end in the path of tappets on a wheel $e^5$ secured to the adjacent end of the carrier shaft $c$. As each pair of pins of the feed conveyer pass downwardly around the upper sprocket wheels the ear carried thereby drops onto the transfer plate, which is rocked to the position shown in Fig. 13 to throw the ear into the carrier pocket, for example, by a suitable spring $e^6$, Fig. 3, surrounding the rock shaft $e$. The tappets $e^5$ are properly positioned to swing the transfer plate back to the position shown in Fig. 1 in time to receive the ears of corn as the latter pass around the upper sprocket wheels. The shaft $e$ of the transfer device is provided with cranked portions opposite to the chains of the feed conveyer so that the shaft can be located close to the conveyer without interfering with the conveyer pins.

F represents clamps or holders on the rotary carrier which are operated automatically to clamp and securely hold the ears of corn in the carrier pockets after they pass the receiving position, and to release the ears at the proper time to deliver them to the gates for one or the other pair of husking rolls. In the construction shown, each clamp consists of a plate arranged transversely in the carrier pocket and provided at opposite ends with legs which straddle the carrier and are connected by a shaft $f$ having a bearing in a transverse hole in the rotary carrier. Suitable springs $f'$ connecting the clamps to the carrier move them to clamp the ears between themselves and the opposite walls of the pockets. The clamps are provided at one end with rock arms $f^2$ having lateral end projections preferably provided with anti-friction rollers. The rollers $f^3$ for two of the opposite clamps are arranged to travel in a plane nearer to the carrier than the rollers $f^4$ for the other two clamps. A stationary cam $f^5$, Figs. 6, 13 and 15, surrounding the carrier shaft and secured to the adjacent frame standard has two cam portions $f^6$ $f^7$, the former, which is shorter than the other, arranged to be engaged by the two clamp rollers $f^3$ nearest to the carrier, and the other $f^7$ arranged in a different plane to be engaged by the other two clamp rollers $f^4$ in the rotation of the carrier. As the carrier rotates, the roller $f^4$ for one of the clamps will engage the long cam $f^7$ and the clamp will be opened to release and deliver the ear of corn held thereby to the gates for the first set of husking rolls, while the roller $f^3$ for the next succeeding clamp will pass the cam $f^7$ and engage the shorter cam $f^6$ at the proper time for the clamp to be opened to release and deliver its ear of corn to the gates for the other pair of husking rolls.

G represents a segmental guard plate surrounding a portion of the periphery of the rotary carrier just above the transfer device E. The guard plate, which is supported, for instance, by a bridge $g$ which extends transversely across the machine over the carrier and is secured at its ends to the frame standards, serves to close the open mouths of the carrier pockets and prevent the escape of the ears when the clamps are moved to grasp them.

H H' represent respectively the cutters or saws for cutting the stalks and tips of the ears. These cutters are mounted at opposite sides of the upper portion of the rotary carrier on a horizontal shaft $h$ journaled at its opposite ends in suitable bearings on the frame standards. The cutters are normally separated a suitable distance to properly cut the shortest ears upon which the machine will have to operate, and the stalk cutter is secured to the shaft at a point such that the ears placed upon the conveyer with their butt ends against the butt gage, will be presented to the stalk cutter so that the stalks will be severed from the ears at or close to the butt ends of the cobs. In the machine shown, the tip cutter is mounted to move toward and from the stalk cutter, and is shifted automatically by the ears of corn in the following manner: The tip cutter is splined on the saw shaft so that it turns therewith, but can move longitudinally on the shaft. The hub of the tip cutter is grooved and engaged by a fork $h^2$, Figs. 3—6, secured to a horizontal slide rod $h^3$ which is movable endwise in a bearing hole $h^4$, Fig. 9, in one of the frame standards. An inclined operating plate I is pivoted at $i$ in any suitable manner to the frame bracket $b^3$ at one side of the machine, and its rear end has a sliding connection $i'$ with the inner end of the slide rod $h^3$. When an ear of corn is carried by the rotary carrier from the feed conveyer toward the cutters H H', the tip end of the ear, unless the ear is of the shortest length, will engage the inclined operating plate and press the latter aside whereby the tip cutter, which is connected to the gage through the horizontal rod $h^3$, will be moved away from the stalk cutter until it is at a distance from the latter substantially equal to the length of the corn cob, and the cutter will cut the ear at or close to the tip end of the cob. If the cob has a soft unfilled tip end, as is often the case, this tip will not have sufficient stiffness to press the tip cutters as far over as if the cob were completely filled out and the cutter will sever or break off this soft tip of the cob. The tip cutter is preferably of such a nature that it will not make a clean cut but will more or less tear the husks so as to leave the tip ends somewhat ragged, which facilitates the action of the husking rolls.

$i^2$, Figs. 6 and 9, represents a weight connected to a cord which is connected at its upper end to the outer end of the slide rod $h^3$ and passes over a pulley $i^3$ journaled on a suitable bracket projecting from the adjacent frame standard. The weight presses the slide rod and the tip cutter connected thereto toward the stalk cutter and holds them yieldingly in the normal position shown in Fig. 6, and to return the cutter to such position when released after it has been moved outwardly by a long ear.

K, Figs. 1, 2 and 6, represents a stalk discharge chute which is supported by the frame standard adjacent to the stalk cutter and inclines downwardly to the rear therefrom. This chute has a forwardly-extending curved guide plate $k$ arranged at the side of the rotary carrier substantially at the bottoms of the pockets thereof. The butt ends of the ears rest against this plate as the ears are carried to the cutters.

$k'$, Fig. 14, represents a spring strip secured at its front end to a supporting bar $k^2$ which is adjustably secured by set screws to horizontal rods $k^3$ projecting laterally from the guard plate G. The free end of the spring strip $k'$ projects toward the guide plate $k$, and terminates in an upward projection slightly in the front of the stalk cutter H. The stalks pass under and deflect this spring strip in the movement of the ears to the cutters, and its upturned end holds the several stalks from rolling forwardly down the guide plate $k$. A flexible wiper or shield $k^4$ is also preferably employed which is supported over the front end of the stalk chute by a rod $k^5$ secured to the adjacent frame standard, and yields to permit the passage of the ears to the cutters, but assists the spring strip $k'$ in preventing the severed stalks, which may accumulate in the upper end of the stalk chute, from rolling forwardly down the guide plate $k$. The accumulating stalks will be moved rearwardly by succeeding ears and discharged down the stalk chute. Any other suitable means for disposing of the severed stalks could be employed.

M M′, Figs. 1, 5, 6 and 7, represent two pairs or sets of husking rolls which are arranged transversely of the machine below the rotary carrier. These rolls preferably consist of rubber-covered shafts $m$ which are journaled at opposite ends in bearing boxes $m'$ which are confined in guide-ways $m^2$ in the opposite frame standards. One roll of each pair is positively driven and drives the companion roll which is geared thereto and is held close enough to the driven roll to grip the husks by adjusting screws $m^3$, Figs. 5 and 10. These screws hold the rolls together and can be adjusted to regulate the pressure of the rolls on the husks. Any other suitable means can be employed for adjustably mounting the husking rolls and regulating their pressure. The rolls are preferably of about the same diameter as the normal ear of corn and are provided with circumferential grooves $m^4$, see Figs. 5 and 7.

The husking rolls are rapidly driven and each pair of rolls will grasp and tear the husks and silk from the ear of corn resting in the valley between them, feed the husks and silk downwardly between them, and discharge the same. To prevent the husks and silk from winding around and clogging the rolls, scrapers N N′, Figs. 1 and 7, are provided having fingers or teeth $n$ entering the circumferential grooves of the rolls. The scrapers are preferably secured to rods $n'$ journaled at their ends in the frame standards and their toothed edges are pressed against the rolls by suitable springs $n^2$ connecting arms $n^3$ on the scrapers to parts of the frame. It is practically impossible for any of the silk or husks, no matter how fine or thin, to pass the scrapers as the teeth thereof enter the grooves of the rolls and can get under the closely clinging silk or husks. The teeth are preferably bent at an angle to the bodies of the scrapers and extend substantially radial with respect to the rolls, while the bodies of the two scrapers for each pair of rolls diverge downwardly from the rolls. Thus there is little tendency for the husks and silk to wedge between the rolls and scrapers but they readily clear themselves and drop by gravity from the rolls. The silking action of the rolls is rendered more certain by wetting the rolls, so that the silk will become wet and cling to the rolls. For this purpose valve-controlled water supply pipes O, Figs. 1 and 4, are provided at one side of the machine in position to discharge water on the rolls.

The husking rolls can be driven by any suitable mechanism. In the machine shown, the shaft of one roll of each pair projects at one end beyond its bearing and is provided with a belt pulley $p$ and a single belt P passing around these pulleys drives both pairs of rolls. The stalk and tip cutters, which are also rapidly rotated, are conveniently driven by this same belt P, for which purpose the belt between the pulleys $p$ passes around a pulley $p'$, Figs. 9 and 6, which is loosely journaled on the shaft $c$ of the rotary carrier and is fixed to or formed with a sprocket wheel $p^2$ connected by a chain $p^3$ to a sprocket wheel $p^4$ on the cutter shaft.

It may be here stated that the invention is in no wise restricted to the mechanisms described and shown for driving the moving parts and other drive means could be employed.

Q Q′ and R R′, Figs. 1, 2, 10, and 11, represent the gates for controlling the delivery of the ears from the rotary carrier to the two pairs of husking rolls M and M′, respectively. The gates for each pair of rolls are arranged above said rolls beneath the rotary carrier and are pivoted to swing upwardly and downwardly toward and from each other, for instance, by studs secured in the frame standards and entering holes in the ends of each of the gates.

The mechanism shown for operating the gates is constructed as follows: S S′ T T′ represent four operating levers for the gates Q Q′ R R′, respectively. These levers are fulcrumed in any suitable manner on the frame standard at one side of the machine with their upper ends arranged in different vertical planes, and with the two pairs of levers at opposite sides of a tappet wheel secured to the shaft $c$ of the rotary carrier and provided with a pair of tappets at diametrically opposite points for each of said levers. Each pair of tappets is arranged in the vertical plane of one lever and is adapted to strike and move said lever twice for each revolution of the carrier. The pairs of tappets $s$ $s'$ $t$ $t'$ operate the levers S S' T T', respectively. The operating levers S and T for the inner gates of the two pairs are slotted at their lower ends and engage pins projecting from rock arms $t^2$ at the adjacent ends of the gates, and when the upper ends of the levers are moved away from the shaft $c$ by the tappets, the inner gates will be swung upwardly to the normal position shown at the left side of Fig. 1 and at the right side of Fig. 11. The other levers S' and T' for the outer gates of the two pairs are connected at their lower ends by links $t^3$ to rock arms $t^4$ on the adjacent ends of the gates, and when the upper ends of these levers are moved away from the shaft $c$ by their tappets, the outer gates Q' and R' will be swung downwardly. The inner gates Q and R are swung downwardly or toward each other by a spring $t^5$, Fig. 11, connecting them, their downward movement being limited by suitable stops $t^6$, Figs. 4 and 11, secured to a rod $t^7$ connecting the frame standards between the gates. The outer gates Q' and R' are swung upwardly by suitable weights $t^8$ connected to one end thereof. The gates Q Q', in Fig. 11, and R R', in Fig. 1, are in the normal position in which they form a hopper or receptacle to receive the ears of corn as they are dropped from the pockets of the rotary carrier.

Assuming the gates to be in the position shown in Fig. 11 and an ear of corn as being husked by the rolls M', the operation of the gates is as follows: After an ear has been dropped onto the gates Q Q', one tappet $s'$ for the outer gate Q' will strike the lever S' and swing said gate downwardly, and the adjacent tappet $s$ for the inner gate Q will release the lever S and said inner gate will be lowered by its spring. The gates will thus open and the ear of corn will slide gently down onto the husking rolls M, first striking the outer roll and then rolling into the valley between the rolls. At the same time, one of the tappets $t'$ for the outer gate R' of the other pair will release its lever T' and said gate will be swung up to the receiving position by its weight $t^8$, and then the adjacent tappet $t$ for the inner gate R will engage its lever T and raise said gate to the receiving position, the gate in returning striking and kicking the husked ear of corn off of the rolls M'. The first pair of gates Q Q' will be held down while the ear is being husked on the rolls M until the tappet $s'$ clears the lever S' for the outer gate Q', when said gate will be raised by its weight $t^8$, and thereafter the second tappet $s$ for the inner gate Q will operate its lever S and raise said gate to the receiving position and kick the ear of corn off of the rolls M. In the meantime the second pair of gates R R' will be operated to receive and deposit another ear of corn on the husking rolls M' in the manner described with reference to the first pair of gates Q Q'. The operation of the holders of the carrier is, of course, timed to drop the ears of corn first on the gates Q Q' and then on the gates R R' while the gates are in the receiving position.

The gates are close to and parallel with the rotary carrier so that the ears only drop a short distance to them, and the ears slide or roll down between the gates, being gently laid or deposited on the husking rolls. There is therefore no opportunity for the ears to turn and fall on end on the husking rolls, but they will all be laid on the rolls parallel therewith regardless of their length and shape and there is little chance for a failure of the rolls to properly husk the corn. Should the ends of the husks of a short ear be caught by the husking rolls, and the ear by any possibility be turned on end, it will not be fed down between the rolls, as the rolls cannot spread far enough apart for the passage of the ear, but it will remain in the upright position until struck by the returning inner gate, which will break off and discharge the ear, thus preventing the clogging of the machine.

U represents a suitable chute arranged between the frame standards below the husking rolls for receiving and discharging the husks and silk, and V V' represent chutes at the front and rear of the machine for receiving the husked corn from the husking rolls and discharging them from the machine.

I claim as my invention:

1. In a corn husking machine, the combination of a traveling feed conveyer on which the ears of corn are adapted to be placed by hand and which is provided with means for supporting the ears of corn transversely of the direction of movement of the conveyer, a rotary carrier arranged at the delivery end of said feed conveyer to turn in a plane parallel with the plane of movement of said feed conveyer and having holders for the ears of corn constructed to hold the ears in fixed position on the rotary carrier, a transfer device which delivers the ears of corn singly from said feed conveyer to the holders of said carrier, means which operate upon the ears of corn and to which the ears of corn are carried by said rotary carrier, and means for releasing the ears of corn from the holders of said rotary carrier.

2. In a corn husking machine, the combination of an endless traveling feed conveyer provided with means for supporting the ears of corn transversely to the direction of movement of the conveyer, a rotating carrier arranged at the delivery end of the feed conveyer to turn in the plane of movement of the latter and having holders to receive the ears of corn, an intermittently operating transfer device which delivers the ears of corn singly from said feed conveyer into the holders of said rotary carrier, husking means arranged below said rotary carrier, and means for releasing the ears of corn from said rotary carrier for delivery to said husking means, substantially as set forth.

3. In a corn husking machine, the combination of a traveling feed conveyer provided with means for supporting the ears of corn transversely to the direction of movement of said conveyer, a rotary carrier arranged at one end of said feed conveyer to turn in the plane of movement of said feed conveyer and having means for receiving the ears of corn, an oscillating transfer device arranged between said feed conveyer and said carrier, means for operating said transfer device to deliver the ears of corn singly from said feed conveyer to said carrier, and husking instrumentalities to which the ears of corn are delivered from said carrier, substantially as set forth.

4. In a corn husking machine, the combination of a rotary wheel carrier arranged to turn about a horizontal axis, peripheral holders on said carrier having movable members actuated by the rotation of said carrier for grasping and firmly holding the ears of corn parallel with the axis of the carrier, husking rolls arranged below said carrier parallel with the axis thereof, and positively actuated means for operating said holders when they are brought to a position over said husking rolls to release the ears of corn for delivery to said husking rolls.

5. In a corn husking machine, the combination of a rotary wheel carrier provided with depressed peripheral transverse pockets for receiving the ears of corn, clamps movable in said pockets of said carrier for holding the ears of corn stationary in said pockets, husking rolls arranged below said carrier parallel with the axis thereof, and means for operating said clamps when said pockets are brought to a position directly over said husking rolls to release the ears of corn for delivery to said husking rolls.

6. In a corn husking machine, the combination of a vertically rotating carrier for the ears of corn, means for feeding the ears to said carrier, husking rolls arranged below said carrier, means arranged between said carrier and said husking rolls upon which the ears of corn drop from said carrier and are held, and mechanism for operating said means to receive the ears of corn from said carrier and gently deposit them upon said husking rolls, substantially as set forth.

7. In a corn husking machine, the combination of husking rolls, movable gates arranged above said husking rolls parallel therewith and adapted to receive the ear of corn, and means for moving said gates toward the husking rolls to deposit the ear of corn upon said rolls, substantially as set forth.

8. In a corn husking machine, the combination of husking rolls, pivoted gates arranged above said husking rolls to swing toward and from each other, and mechanism for swinging said gates to a position to receive the ear of corn and then swinging said gates downwardly to deposit the ear of corn on said husking rolls, substantially as set forth.

9. In a corn husking machine, the combination of a carrier for the ears of corn, husking rolls arranged below said carrier, movable gates arranged between said carrier and said husking rolls, and means for operating said gates to receive the ears of corn from said carrier and deposit the same upon said husking rolls, substantially as set forth.

10. In a corn husking machine, the combination of a carrier for the ears of corn, husking rolls arranged below said carrier, pivoted gates arranged between said carrier and said husking rolls, and mechanism for swinging said gates to a position to receive the ear of corn from said carrier and then swinging said gates downwardly to deposit the ear of corn upon said husking rolls and then returning said gates to the receiving position to discharge the ear of corn from the husking roll, substantially as set forth.

11. In a corn husking machine, the combination of a carrier for the ears of corn, husking rolls arranged below said carrier, pivoted gates arranged between said carrier and said husking rolls, and mechanism for holding said gates in a position to receive the ear of corn from said carrier, then opening said gates downwardly to deposit the ear of corn on said husking rolls, then returning one gate to the receiving position and finally moving the other gate to discharge the ear of corn from said husking rolls and return the gate to the receiving position, substantially as set forth.

12. In a corn husking machine, the combination of a carrier for the ears of corn, two sets of husking rolls arranged below said carrier, means for releasing the ears of corn for delivery alternately to said sets of rolls, gates between each set of rolls and said carrier, and means for operating said gates to receive ears of corn from said carrier and deliver them to said husking rolls, substantially as set forth.

13. In a corn husking machine, the combination of a carrier for the ears of corn, two sets of husking rolls arranged below said carrier, means for releasing the ears of corn for delivery alternately to said sets of rolls, devices between said carrier and said sets of husking rolls for controlling the delivery of the ears of corn thereto, and means for operating said controlling devices to receive the ears of corn from said carrier and deliver them to said husking rolls, substantially as set forth.

Witness my hand, this 1st day of November, 1907.

ARTHUR P. WOLFE.

Witnesses:
C. W. PARKER,
C. B. HORNBECK.